United States Patent Office 3,256,333
Patented June 14, 1966

3,256,333
BICYCLO[3.3.0]OCTYL KETONES AND RELATED PRODUCTS
Rostyslaw Dowbenko, Gibsonia, Pa., assignor to Pittsburgh Plate Glass Company, Pittsburgh, Pa., a corporation of Pennsylvania
No Drawing. Filed Jan. 29, 1963, Ser. No. 254,576
7 Claims. (Cl. 260—586)

This invention relates to derivatives of bicyclo[3.3.0] octane, and more particularly to such derivatives formed by transannular cycloadditions to 1,5-cyclooctadiene.

It is known that cyclic alkenes, such as cyclohexene, form 1:1 addition products with various reactive compounds. For example, the reaction of cyclohexene with carbon tetrachloride produces 1-trichloromethyl-2-chloro-cyclohexane. It would be expected, therefore, that compounds such as 1,5-cyclooctadiene would produce a mixture of 1:1 and 1:2 adducts having similar structures.

It has been found, however, that 1,5-cyclooctadiene does not undergo simple addition reactions in many instances and that the reaction of 1,5-cyclooctadiene with aldehydes results in a transannular rearrangement to produce bicyclo[3.3.0]octane derivatives.

The dicyclo[3.3.0]octane derivatives to which this invention relates and which are produced as a result of the reaction of 1,5-cyclooctadiene with aldehydes can be represented by the formula:

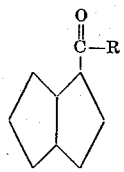

where R is alkyl or aryl. The group represented by R may be substituted, for example, with halogens, alkoxy radicals, or a bicyclo[3.3.0]octane containing structures such as

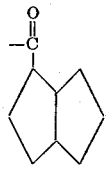

Among the aldehydes which react with 1,5-cyclooctadiene to produce the aforesaid compounds are acetaldehyde, propionaldehyde, n-butyraldehyde, isobutyraldehyde, valeraldehyde, pivalaldehyde, caproaldehyde, heptaldehyde, caprylaldehyde, pelargonaldehyde, capraldehyde, benzaldehyde, p-tolualdehyde, anisaldehyde, alpha-naphthaldehyde, beta-methoxypropionaldehyde, 2,2,3-trichlorobutyraldehyde, chloral, piperonal, and other aliphatic, aryl and substituted aldehydes, preferably having up to about 20 carbon atoms per molecule. Glyoxal, succinaldehyde, glutaraldehyde, adipaldehyde and other dialdehydes may also be utilized. Dialdehydes react to produce, at least in part, products corresponding to the above formula in which the R group is substituted with another bicyclo[3.3.0]octane derivative, i.e., having the formula:

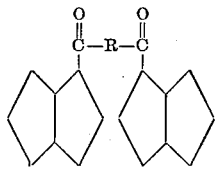

The reaction conditions used to produce the bicyclo[3.3.0]octane derivative from the aldehyde and 1,5-cyclooctadiene are not critical. For instance, no solvent is necessary, although one can be employed if desired. Similarly, the ratio of reactants does not affect operability of the reaction, although better yields are obtained if an excess of the aldehyde is present, and it is for this reason that a substantial stoichiometric excess of the aldehyde is ordinarily utilized. Generally, the reaction is carried out with at least 5 moles of aldehyde per mole of 1,5-cyclooctadiene. When a dialdehyde is employed, 2 moles of 1,5-cyclooctadiene may react with each mole of dialdehyde and thus higher mole ratios may be used.

In general, the reaction should be carried out at conditions at which free radical catalyzed additions take place. A catalyst as such is not always necessary, but when a catalyst is not employed, elevated temperatures, 100° C. or higher, and preferably 150 to 250° C., should be employed. Alternatively, a free radical-producing catalyst may be utilized. Among the catalysts which are used are peroxides, azo compounds such as azobis(isobutyronitrile), ultraviolet light, ferric chloride, and similar known free radical-producing catalysts.

When a catalyst is present, the preferred temperature is that at which the catalyst yields free radicals at an appreciable rate. This temperature varies with the particular catalyst; for example, using benzoyl peroxide the temperature should be 70° C. or higher; with azobis(isobutyronitrile), 50° C. or higher; with di(tertiary butyl) peroxide, 120° C. or higher; while with ultraviolet light room temperature is often satisfactory.

The amount of catalyst present is usually at least about 0.02 mole percent, based upon the 1,5-cyclooctadiene, but the reaction takes place with lower or higher amounts and, as noted above, does not always require the presence of catalyst.

Set forth below are several examples which will serve to illustrate the method and practice of the invention.

EXAMPLE 1

*Reaction of 1,5-cyclooctadiene with acetaldehyde*

A mixture of 108.2 grams of 1,5-cyclooctadiene, 176.4 grams of acetaldehyde and 4.84 grams of benzoyl peroxide was heated in a sealed vessel at 80° C. for 48 hours. After cooling, the reaction mixture was distilled and the fraction boiling at 86–96° C. at 10 mm. pressure was redistilled to produce methyl exo-cis-2-bicyclo[3.3.0]octyl ketone of the structure:

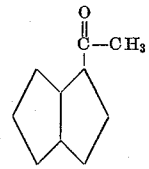

It was identified by infrared analysis and gas chromatography in addition to chemical analysis.

Analysis (calculated for $C_{10}H_{16}O$):

|   | Calculated | Found |
|---|---|---|
| C | 78.89 | 77.39 |
| H | 10.59 | 10.46 |

EXAMPLE 2

*Reaction of 1,5-cyclooctadiene with butyraldehyde*

A mixture of 54 grams of 1,5-cyclooctadiene, 108 grams of butyraldehyde and 2.42 grams of benzoyl peroxide was refluxed at 80° C. for 24 hours. An additional 2.42 grams of benzoyl peroxide was added and the mixture maintained at reflux temperatures for another 24 hours. Upon distillation of the mixture the fraction boiling at 62–64° C. at .09 mm. pressure was propyl exo-cis-2-bicyclo[3.3.0]octyl ketone of the structure:

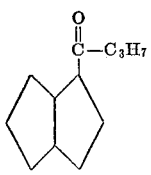

The product was identified by chemical analysis, infrared analysis, and its gas chromatogram.

Analysis (calculated for $C_{12}H_{20}O$):

|   | Calculated | Found |
| --- | --- | --- |
| C | 79.94 | 78.38 |
| H | 11.18 | 11.06 |

The compounds produced in accordance with this invention can be used for various purposes. For example, they are useful as plasticizers for resinous compositions. They are also valuable chemical intermediates and can be used to produce various organic derivatives, such as, for example, the corresponding azines, which can be used as anti-oxidants, anti-skinning agents and for other purposes.

According to the provisions of the patent statutes, there are described above the invention and what are now considered to be its best embodiments. However, within the scope of the appended claims, it is to be understood that the invention may be practiced otherwise than as specifically described.

I claim:
1. The method of producing a bicyclo[3.3.0]octane derivative which comprises reacting 1,5-cyclooctadiene with an aldehyde at conditions at which free radical catalyzed additions take place, said aldehyde being selected from the group consisting of aromatic and aliphatic mono- and di-aldehydes having up to about 20 carbon atoms and having no substituents other than methoxy and chlorine.

2. The method of claim 1 in which a stoichiometric excess of said aldehyde is present.
3. The method of claim 1 in which the reaction is carried out in the absence of a catalyst at a temperature of at least about 100° C.
4. The method of claim 1 in which the reaction is carried out in the presence of a free radical-producing catalyst and at a temperature at which the said catalyst yields free radicals at an appreciable rate.
5. The method of producing a bicyclo[3.3.0]octane derivative which comprises reacting 1,5-cyclooctadiene with alkyl aldehyde of up to about 20 carbon atoms at conditions at which free radical catalyzed additions take place.
6. The method of producing methyl exo-cis-2-bicyclo[3.3.0]octyl ketone which comprises reacting 1,5-cyclooctadiene with acetaldehyde at conditions at which free radical catalyzed additions take place.
7. The method of producing propyl exo-cis-2-[3.3.0] octyl ketone which comprises reacting 1,5-cyclooctadiene with butyraldehyde at conditions at which free radical catalyzed additions take place.

References Cited by the Examiner

UNITED STATES PATENTS

| 2,407,508 | 9/1946 | Morris et al. | 260—586 |
| 2,517,684 | 8/1950 | Ladd et al. | 260—586 X |
| 2,957,906 | 10/1960 | Erickson et al. | 260—586 X |

OTHER REFERENCES

Chappell et al.: "Chem. Abst.," vol. 57 (1962), col. 13330c.

Migrdichian: Organic Synthesis, vol. II, p. 1069 (1957).

Pregaglia et al.: "Chem. Abst.," vol. 59 (1963), col. 12658h.

LEON ZITVER, *Primary Examiner.*

LORRAINE A. WEINBERGER, M. M. JACOB,
*Examiners.*